United States Patent [19]

Dobson et al.

[11] 4,239,126

[45] Dec. 16, 1980

[54] SEED SOWER HAVING APERTURED PICK-UP MEMBER

[76] Inventors: George M. Dobson, 293 Clanfield Rd.; Donald T. Zerner, 108 Hyde St., both of North Rockhampton, Queensland, Australia, 4701; Austin J. Dobson, 4 West St., Rockhampton, Queensland, Australia, 4700

[21] Appl. No.: 44,581

[22] Filed: Jun. 1, 1979

[30] Foreign Application Priority Data

Nov. 30, 1977 [AU] Australia .............................. PD2610
Jan. 16, 1979 [AU] Australia .............................. PD7373

[51] Int. Cl.³ .............................................. A01C 7/04
[52] U.S. Cl. .................................................. 221/211
[58] Field of Search ....................... 221/211, 260, 278; 222/148; 111/90, 25, 1, 2, 77

[56] References Cited

U.S. PATENT DOCUMENTS

| | | | |
|---|---|---|---|
| 3,022,755 | 2/1962 | Roepke | 221/260 X |
| 3,788,518 | 1/1974 | Beebe | 221/211 |
| 3,885,704 | 5/1975 | Lienemann et al. | 221/211 |
| 4,037,755 | 7/1977 | Reuter | 221/211 |

*Primary Examiner*—Stanley H. Tollberg
*Attorney, Agent, or Firm*—Schwartz, Jeffery, Schwaab, Mack, Blumenthal & Koch

[57] ABSTRACT

A seed sower is provided having an apertured driven pick-up member which has spaced apertures in its periphery in communication with a suction member. The apertures are moved through seed storage means so that single seeds are picked up by the pick-up member by suction and held over each aperture. The seeds are carried to a discharge locality and released for planting. The pick-up member is hollow and has an internal sealing member which contacts each spaced aperture adjacent to the discharge locality thereby sealing off the suction and allowing each seed to travel to the discharge locality.

8 Claims, 4 Drawing Figures

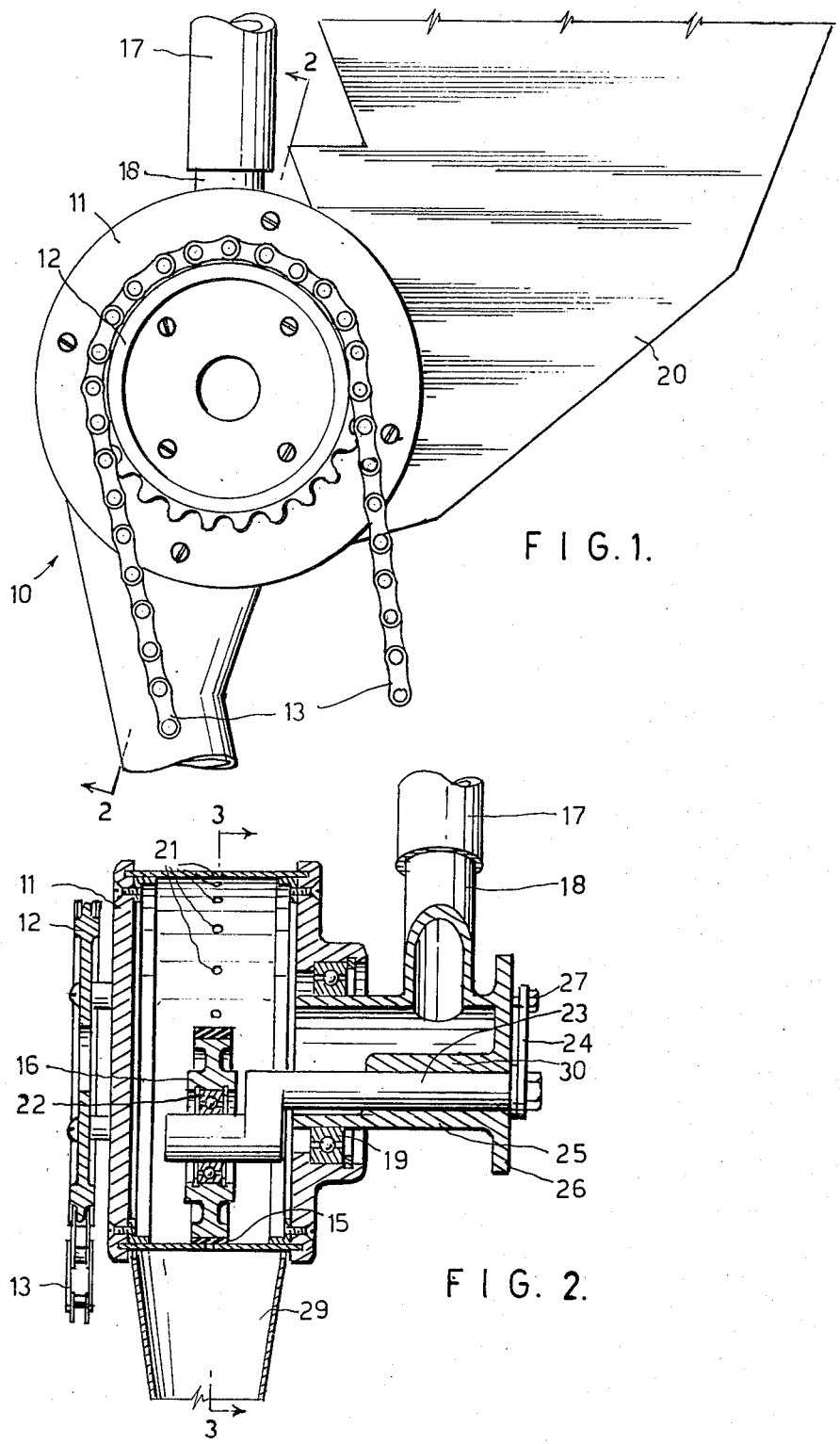

SEED SOWER HAVING APERTURED PICK-UP MEMBER

BACKGROUND OF THE INVENTION (1) Field of the Invention

This invention relates to an improved seed sower.

(2) Description of the Prior Art

In order to fully describe the invention, reference is made to Australian Patent Specification No. 25666/67 which forms a good example of prior art. This invention refers to a planter having a drum or cylinder with spaced holes about its periphery. The drum rotates and at any time part of the periphery communicates with a hopper which stores a supply of seed so that single seeds are picked up by each spaced hole. The interior of the drum has a suction applied so that seeds are retained in position in either respective holes as the drum rotates.

Difficulty has been experienced in planters of the type disclosed in Specification No. 25666/67 because the seeds were subject to a scraper which scraped the seeds from their respective holes in order for the seed to be released and fed into a planting mechanism or share. Normally the scrapers were in the form of blade type wipers or brushes and succeeded in breaking the seeds, or only allowing in separating the husk of the seed from the core and, subsequently succeeded in destroying germination. Also clogging of the holes occurred and this meant that the clogged hole could not pick up a seed on its following revolution thereby resulting in regular "misses".

BRIEF SUMMARY OF THE INVENTION

An object of the invention is to provide a seed sower which alleviates the above-mentioned problems of the prior art.

The seed sower of the invention includes:

an apertured driven pick-up member having spaced apertures in communication with a suction means and which apertures move through seed storage means in such manner that single seeds are picked up at the apertures by suction and held over each aperture and carried to a discharge locality and released for planting, characterized in that the pick-up member is hollow and is provided with an internal sealing member having an exterior surface which contacts the interior of each filled aperture adjacent the discharge locality thereby sealing off the suction and allowing each seed to travel to the discharge locality.

By contacting the interior surface of each filled aperture, the exterior surface of the internal member seals off the suction which is usually applied from the interior of the pick-up member with the result that the seed is no longer held by the suction in its associated aperture and thereby falls through a discharge outlet.

Preferably the external surface of the internal sealing member is of a resilient nature as this enhances the desired sealing action.

In a more preferred form the sealing member is a rotatable member such as a roller or wheel and the pick-up member is a drum having the said apertures in its periphery and in that at any time part of the said periphery communicates with a hopper which forms the seed storage means.

The roller is also desirably provided with a plurality of outwardly extending tines, or finger members which may be located on the external surface of the sealing roller and so arranged as to project through an adjacent aperture of the pick-up drum and thereby push the held seed away from its respective aperture to the discharge locality. Each tine may have an outer sheath of resilient material to enhance the sealing action of the roller. Alternatively each tine may have a non-resilient outer surface but the area of the sealing roller which surrounds each tine may be of a resilient nature.

In another variation the sealing roller may be replaced by a wheel having a plurality of spokes with each spoke being equivalent to the above-mentioned tines. Each spoke desirably has an outer sheath of resilient material or is surrounded by a zone of resilient material.

Most desirably the sealing roller is freely rotatable and is rotated by the above-mentioned tines which engage with an associated aperture of the pick-up-drum when it rotates. In this embodiment the sealing roller has a rotational axis which does not coincide with the rotational axis of the pick-up drum but is located therebelow.

In another variation the roller and drum may be provided with gears to maintain accurate meshing of the tines with the spaced apertures in the drum.

In yet another variation the roller or wheel may have an outer sheath of resilient material which is not provided with tines and effectively seals off each aperture of the pick-up drum to allow displacement of each seed from its respective aperture.

In another possible variation the sealing member may be provided with a rotatable chain or band having either a plurality of tines or alternatively which is of resilient material wherein the band is rotated on an appropriate support. When provided with tines each tine may be mounted in such a fashion so that it is biased inwardly. The movement of the rotatable band may be subject to a cam so that the band only contacts the interior surface of the pick-up drum adjacent the discharge locality.

BRIEF DESCRIPTION OF THE SEVERAL VIEWS OF THE DRAWINGS

Reference is now made to preferred embodiments of the invention as shown in the attached drawings, wherein:

FIG. 1 is a side elevation of a seed sower constructed in accordance with the invention;

FIG. 2 is a section view of the seed sower illustrated in FIG. 1 along the line 2—2;

DETAILED DESCRIPTION OF THE PREFERRED EMBODIMENT

Figure 3:
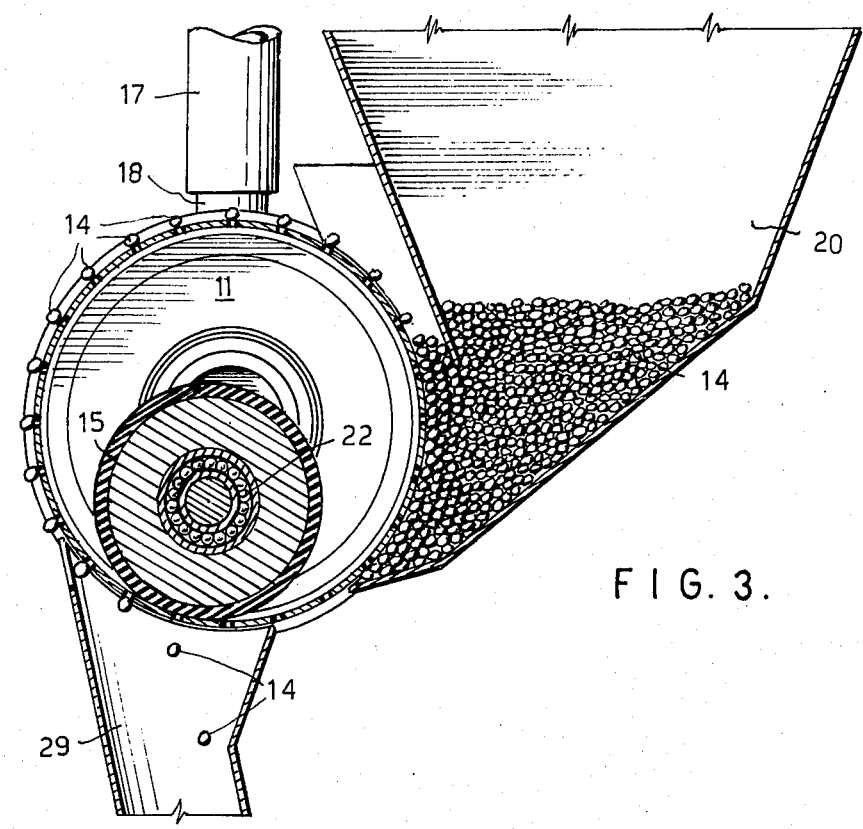
FIG. 3 is a sectional view of the seed sower illustrated in FIG. 2 along the line 3—3.

In the drawings, the sower 10 includes pick-up drum 11, driven by an appropriate drive means such as sprocket wheel 12 and drive sprocket 13. The drum is in communication with a suction pump (not shown) introduced through connector conduit 17 which is engaged with an upwardly extending pipe 18 as shown. The drum 11 rotates on bearing 19. There is also shown sealing roller 16 having an outer sheath or band of resilient material 15.

As the drum 11 rotates, its outer surface is brought into contact with seed 14 in hopper 20 through the suction applied to the interior of the drum 11 through conduit 17. Individual seeds through the suction are applied onto apertures 21 spaced around the drum 11 and thereby carried around the exterior surface thereof as shown in FIG. 1.

At the predetermined point, the seed is released by means of roller 16 sealing the seed from the suction applied to the interior of drum 11, by the action of sealing band 15 which protrudes slightly into the apertures 21 and further assists in removal of seed.

In FIG. 2 it will be noted that roller 16 rotates on bearing 22 supported by a cranked shaft 23 with lever 24 fixed to its outer end. The shaft 23 is rotatably supported by bearing 30 which is fixed to rearwardly extending tubular portion 25 of sower 10. The shaft 23 passes through rear plate 26 of sower 10. Lever 24 is supported by screw 27 at its top end and by shaft 23 at its bottom end as shown.

By turning the cranked shaft 23, the position of roller 16 relative to the interior surface of drum 11, can be varied thereby providing for adjustment of pressure exerted on the drum 11 by roller 16. By locking level 24 in a fixed position by means of screw 27, a fixed and predetermined pressure can be maintained between roller 16 and drum 11. There also could be provided other appropriate pressure adjustment means than that specifically described—i.e. by use of compression or tension springs, slide or equivalent arrangement.

Figure 4:
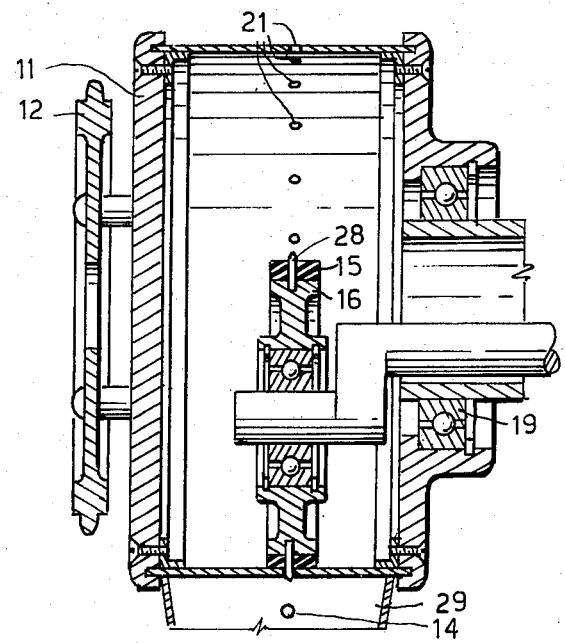
FIG. 4 is a sectional end view of a modified seed sower constructed in accordance with the invention.

In FIG. 4 it will be noted that in a modification of the invention, roller 16 is provided with tines 28 which as shown are so arranged on roller 16 that they positively clear apertures 21 and also protrude therethrough when the roller band 15 contacts the interior surface of the drum 11. The tines 28 may have a resilient sheath as described previously. The seeds fall through discharge passage 29 as in FIGS. 1-3.

The resilient material utilized in this invention may be of any appropriate type such as rubber. The sealing roller can be of any convenient diameter or width and can be loaded onto the inner drum surface by a mechanical crank spring or the like to create sufficient contact to seal with apertures from the suction applied.

It will also be appreciated that seeds sown in accordance with the invention can be sown at a regular spacing and at a regular rate thereby increasing crop yields.

It will further be appreciated that multiple lines of apertures 21 may be provided about the periphery of drum 11, as well as a single line of apertures or, alternatively, the apertures 21 may be provided in a random fashion about drum 11 if desired.

We claim:

1. A seed sower including an apertured driven pick-up member in the form of a rotatable drum having spaced apertures in communication with a suction means and which apertures move through seed storage means in such manner that single seeds are picked up at the apertures by suction and held over each aperture and carried to a discharge locality and released for planting, characterized in that the pick-up member is hollow and is provided with an internal sealing member having an exterior surface which contacts the interior of each filled aperture adjacent the discharge locality thereby sealing off the suction and allowing each seed to travel to the discharge locality, said internal sealing member comprising a rotatable roller having a rotational axis which is spaced from the rotational axis of said drum, said roller being provided with a plurality of outwardly extending tines on the exterior surface thereof, each of said tines being arranged to project through an adjacent aperture of the rotatable drum and thereby push the held seed away from its respective aperture to the discharge locality.

2. The seed sower as claimed in claim 1 wherein the exterior surface of said roller is of a resilient nature.

3. The seed sower as claimed in claim 1 wherein said roller is freely rotatable and is rotated by said tines as they engage a respective aperture of said pick-up drum as said drum rotates.

4. The seed sower as claimed in claim 1 further including means for varying the position of said roller relative to the interior surface of said pick-up drum so as to adjust the pressure exerted on the drum by the roller.

5. A seed sower including an apertured driven pick-up member in the form of a rotatable drum having spaced apertures in communication with a suction means and which apertures move through seed storage means in such manner that single seeds are picked up at the apertures by suction and held over each aperture and carried to a discharge locality and released for planting, characterized in that the pick-up member is hollow and is provided with an internal sealing member having an exterior surface which contacts the interior of each filled aperture adjacent the discharge locality thereby sealing off the suction and allowing each seed to travel to the discharge locality, said internal sealing member comprising a freely rotatable roller having a rotational axis which is spaced from the rotational axis of said drum, said roller being provided with a plurality of tines on the exterior surface thereof, said tines engaging a respective aperture of said pick-up drum for rotating said drum.

6. The seed sower as claimed in claim 5 wherein the external surface of said roller is of a resilient nature.

7. The seed sower as claimed in claim 5 wherein each of said tines has an outer sheath of resilient material.

8. The seed sower as claimed in claim 5 further including means for varying the position of the roller relative to the interior surface of the pick-up drum so as to adjust the pressure exerted on the drum by the roller.

* * * * *